United States Patent [19]

Twerdochlib

[11] Patent Number: 5,469,745
[45] Date of Patent: Nov. 28, 1995

[54] SYSTEM FOR DETERMINING FOVM SENSOR BEAT FREQUENCY

[75] Inventor: Michael Twerdochlib, Oviedo, Fla.

[73] Assignee: Westinghouse Electric Corporation, Pittsburgh, Pa.

[21] Appl. No.: 69,495

[22] Filed: Jun. 1, 1993

[51] Int. Cl.$^6$ .................................................. G01N 29/00
[52] U.S. Cl. .................................................. 73/660; 73/655
[58] Field of Search ............................ 73/651, 596, 660, 73/602, 653, 655, 659

[56] References Cited

U.S. PATENT DOCUMENTS

| | | | |
|---|---|---|---|
| 4,218,614 | 6/1978 | Miller | 250/231 |
| 4,283,634 | 8/1981 | Yannone et al. | 290/40 |
| 4,321,464 | 3/1982 | Miller | 250/231 |
| 5,069,071 | 12/1991 | McBrien et al. | 73/654 |
| 5,109,700 | 5/1992 | Hicho | 73/660 |
| 5,146,776 | 9/1992 | Twerdochlib et al. | 73/657 |

*Primary Examiner*—Richard Chilcot
*Assistant Examiner*—Max H. Noori

[57] ABSTRACT

A method for determining a beat frequency in a vibration sensing system attached to an electrical generator comprises the steps of (a) generating a vibration signal indicative of a vibrational frequency and amplitude of the generator; and (b) obtaining a beat frequency from the vibration signal by storing and processing time interval data representing the time intervals between zero crossings of the vibration signal. A generator 10, optical vibration sensor 12, and computer 14 constitute the vibration sensing system 16. The computer is programmed to analyze the time interval data to obtain the beat frequency.

18 Claims, 11 Drawing Sheets

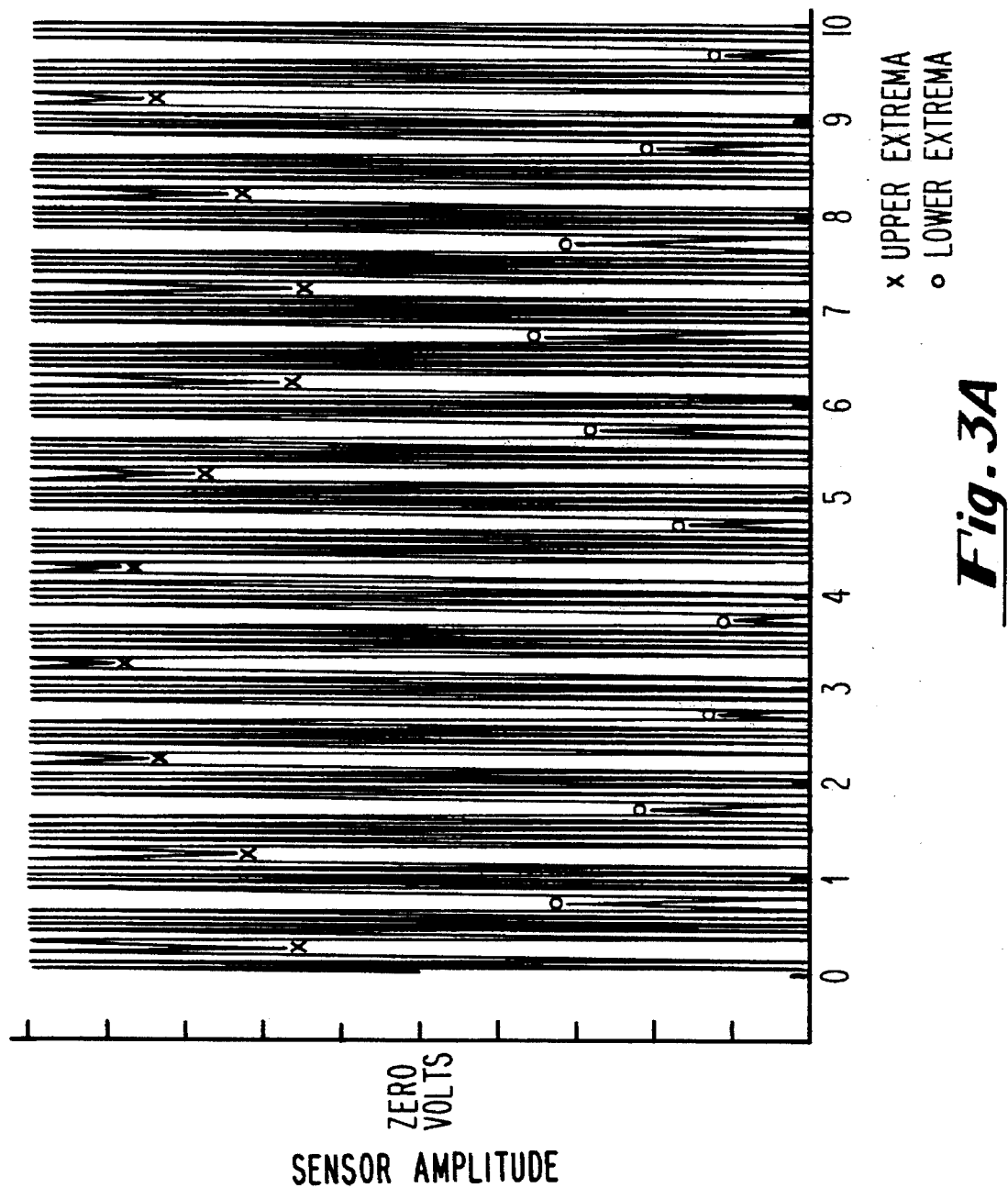

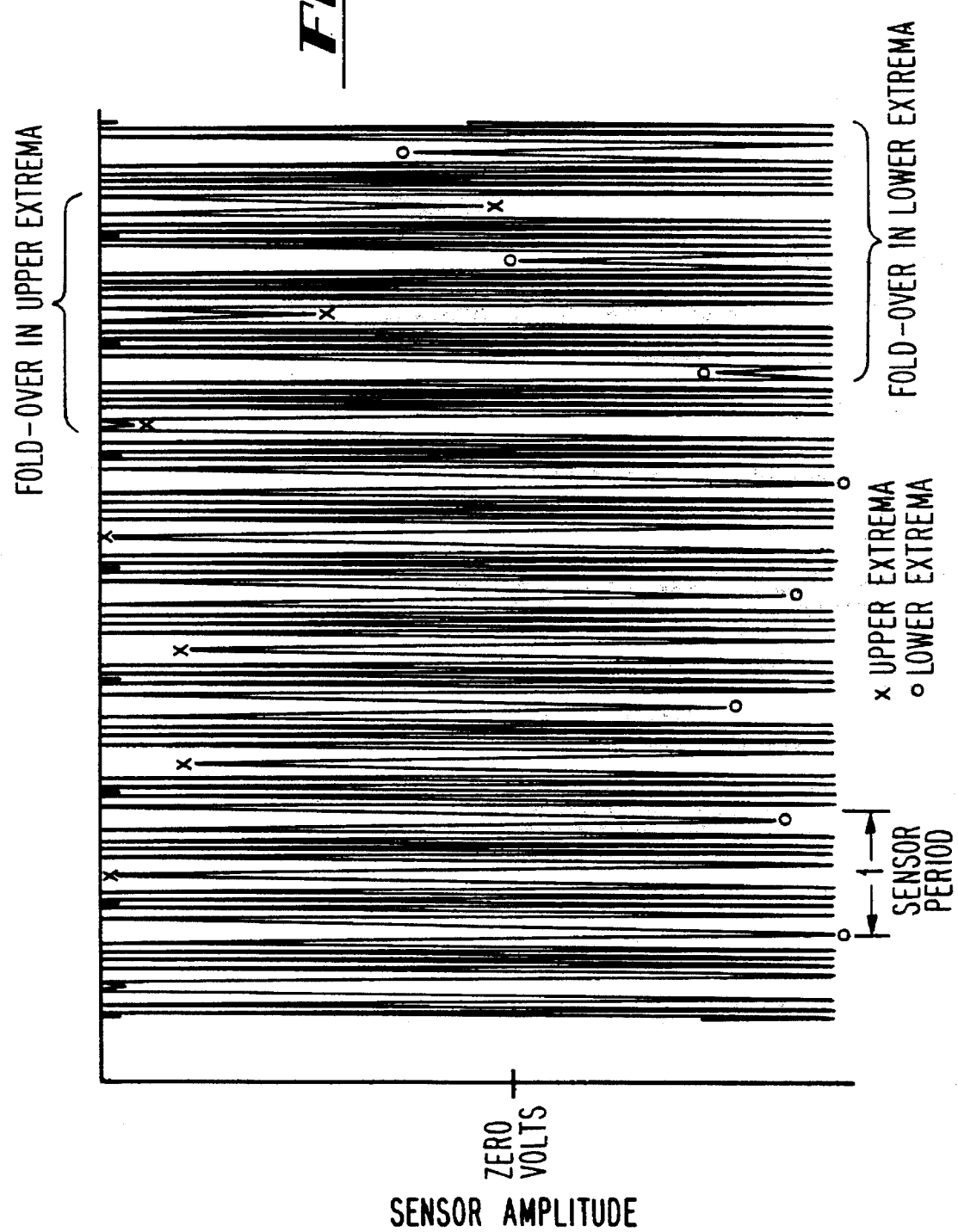

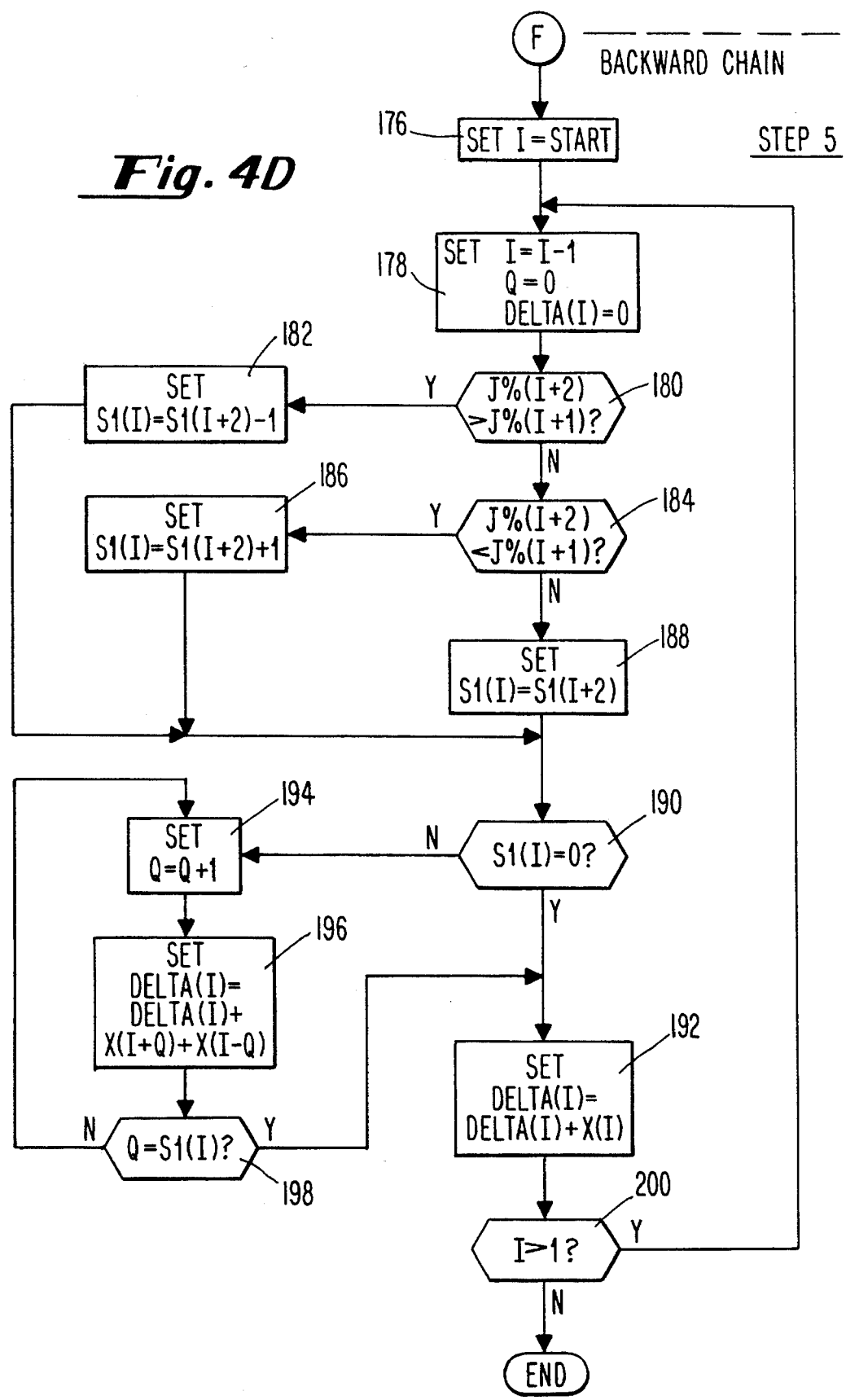

SYSTEM FOR DETERMINING FOVM SENSOR BEAT FREQUENCY

BACKGROUND OF THE INVENTION

The present invention relates generally to electrical generators, and more particularly to a system for monitoring the vibration of an electrical generator.

U.S. Pat. No. 5,146,776, Sep. 15, 1992, titled *Method for Continuously Calibrating an Optical Vibration Sensor*, discloses a system for automatically calibrating a fiber optic vibration monitor (FOVM) employing a cantilever-mounted grid attached to a generator. The grid interrupts a light beam at a frequency directly proportional to the sensor's vibrational amplitude at a singular driving frequency (i.e., 120 Hz). The system disclosed in the patent is illustrated in FIG. 1. A generator 10, optical vibration sensor 12, and computer 14 constitute the vibration sensing system 16. The patent teaches how troublesome conditions of the generator can be detected at an early stage by measuring the vibration amplitude of a generator end-winding. This allows maintenance to be scheduled to avoid damage to the generator and minimize down time.

Briefly, the system may be described as follows: The optical vibration sensor 12 is mounted directly to an end-winding 17 of the generator 10. The massive exciter-end and turbine-end end-turns of the generator are consolidated into semi-ridged baskets to prevent damaging effects of the 120 Hz vibration coupled into the system from the rotor field. The sensor monitors the end-turn vibration to provide warning signals when destructive levels of vibration exist or when the vibration level is increasing. The vibration may then be controlled through load management or change in coolant gas temperature until an outage can be scheduled for the generator.

FIG. 2 illustrates the optical vibration sensor 12 in more detail. The optical vibration sensor 12 receives light from an optical fiber cable 18. The sensor includes a housing 20 and an optical-to-digital conversion unit 22. The housing 20 includes an internal reed 24 and a grid assembly 26. The internal reed 24 and the grid assembly 26 are designed to have a natural resonant frequency above 120 Hz. Preferably, the resonant frequency is approximately 132 Hz for a 60 Hz generator application. See U.S. Pat. No. 4,321,464, Mar. 23, 1982, or U.S. Pat. No. 4,218,614, Aug. 19, 1980, for further details of the sensor 12.

The following discussion assumes the generator is producing 60 Hz electrical power, although the principles are the same for a 50 Hz unit.

As the internal reed vibrates, the grid assembly 26 moves up and down, causing light pulses to be produced. The number of light pulses produced in a given time interval is proportional to the amplitude of the 120 Hz (100 Hz in Europe) vibration being measured. The grid assembly 26 has evenly spaced grid openings separated by 10 mils. Thus, the number of light pulses produced in a given time interval is a function of the resonant frequency of the sensor and the distance the grid swings from its equilibrium position. The light pulses are output from the casing 20 through the optical fiber cable 18 to the optical-to-electrical conversion unit 22. The optical-to-electrical conversion unit 22 converts the light pulses into a digital signal according to a conventional method. For example, a photodiode can be utilized to convert the light pulses to an electrical signal which can then be converted into a digital frequency output signal. The output signal waveform takes the form of a frequency modulated sine wave. The signal is, furthermore, slightly frequency-modulated by the mixing of the 120 Hz excitation with the resonant frequency of the sensor.

The system employs curve fitting of the beat signal peaks to a trigonometric function of the form $\sin(2\pi f_B t)$ to determine the beat frequency $f_B$. The beat frequency is then used to calibrate the system. In particular, the system computes an amplification factor $$M_0=(120/f_0)^2/(1-(120/f_0)^2),$$

where the sensor's resonant frequency is given by $$f_0=120\ Hz+f_B.$$

Thus, the resonant frequency $f_0$ of the optical vibration sensor determines the amplification factor $M_0$. To obtain the actual displacement of the generator due to vibration at 120 Hz, the measured amplitude (i.e., as determined by the light pulse signal) must be divided by the amplification factor. Note that the equation for $M_0$ results from the correlation between the light pulse frequency and the amplitude of the grid, which can be expressed, for the grid-reed geometry employed by the assignee (Westinghouse), as:

Amplitude of vibration=$f_{LP} \times 1$ mil/180 Hz, where $f_{LP}$ is the light pulse frequency (Hz). This equation is true for a grid assembly having a grid spacing of 10 mils.

In sum, the system employs the amplitude of the signal at the "extrema" to determine the beat frequency. Such a beat frequency is discernable from FIG. 3A, which depicts a waveform representative of an ordinary sensor signal. The extrema are the furthest points in the grid's motion as it oscillates about its equilibrium position. The largest wavelengths in the frequency modulated output signal (i.e., the points in the waveform where the zero crossings are spread apart the most) correspond to the extrema, since the extrema are where the grid comes momentarily to rest before reversing direction.

The present invention addresses the problem that occurs when the beat amplitude becomes large enough to cause a fold-over, distorting the beat frequency. This problem also occurs in connection with a small beat amplitude when the signal at the extrema occurs near the peak signal values. An illustration of a small fold-over phenomenon is shown in FIG. 3B. Very large fold-overs often occur in the field. However, the waveform extrema for such large fold-overs are difficult to visualize and thus are not depicted. As discussed above, to determine the actual displacement of the generator due to vibration at 120 Hz, the amplification factor $M_0$ must be determined. To determine the amplification factor, the resonant frequency of the sensor ($f_0+f_B$) must be accurately determined. However, when fold-overs occur, they distort the beat signal determined from the extrema such that it becomes extremely difficult to determine the beat frequency, making it practically impossible to accurately determine the resonant frequency of the sensor. Moreover, the resonant frequency drifts (changes) with temperature and with age of the sensor. Therefore, one cannot assume that the resonant frequency of the sensor is whatever it was designed to be. It must be measured in the field, while the generator is operating.

SUMMARY OF THE INVENTION

Accordingly, a primary object of the present invention is to provide a system for determining FOVM sensor beat frequency in environments with a high beat amplitude. Another object of the present invention is to provide such a system which will also determine FOVM sensor beat frequency in environments wherein the beat amplitude is small but the signal at the extrema occurs near the peak signal values.

According to the present invention, methods (or apparatus) for determining a beat frequency in a vibration sensing system attached to equipment comprise the steps of (or means for): (a) generating a vibration signal indicative of a vibrational frequency and amplitude of the equipment; and (b) obtaining a beat frequency from the vibration signal by storing and processing time interval data representing the time intervals between zero crossings of the vibration signal.

In one preferred embodiment of the present invention, the equipment is an electrical generator having a 120 HZ end-turn vibration, the vibration signal is obtained with a vibration sensor attached to the generator, and the vibration signal includes a mechanical vibration signal resulting from the 120 Hz end-turn vibration of the electrical generator and the resonant frequency of a vibration sensor. Further, in the preferred embodiment, step (b) comprises calculating time interval data by summing clock counts between consecutive zero crossings of the vibration signal, finding positions of extrema time intervals corresponding to fold-overs in the time interval data, compensating for said fold-overs by changing the number of zero crossing time intervals summed about the extrema affected by said fold-overs, and performing a Fourier transform on the time interval data to obtain transformed time interval data which has a peak value at a point corresponding to the beat frequency.

Other features of the present invention are described below.

BRIEF DESCRIPTION OF THE DRAWINGS

FIGS. 3A–3H are waveform diagrams demonstrating the improved performance provided by a system, in accordance with the present invention, for determining FOVM sensor beat frequency.

FIGS. 4A–4D collectively are a flow diagram of one preferred implementation of the present invention.

DETAILED DESCRIPTION OF PREFERRED EMBODIMENTS

The present invention provides a method for use in an FOVM system for measuring the motion of the grid at the extrema. The method employs the change in length of the time period defined by the signal zero crossings on either side of the extrema (i.e., the time interval extrema).

Figure 1:
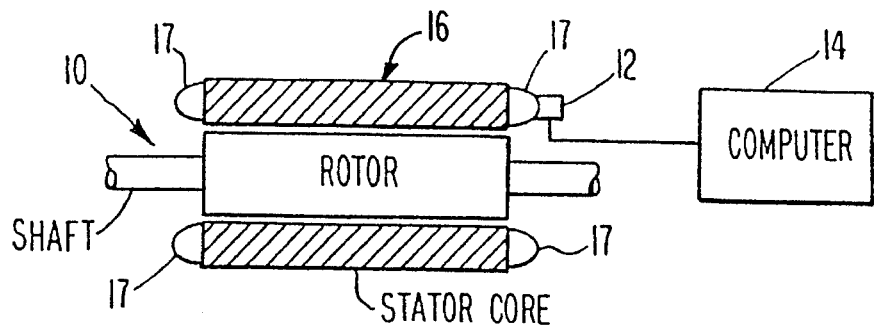
FIG. 1 is a schematic depiction of an FOVM as applied to an electrical generator.
Figure 2:
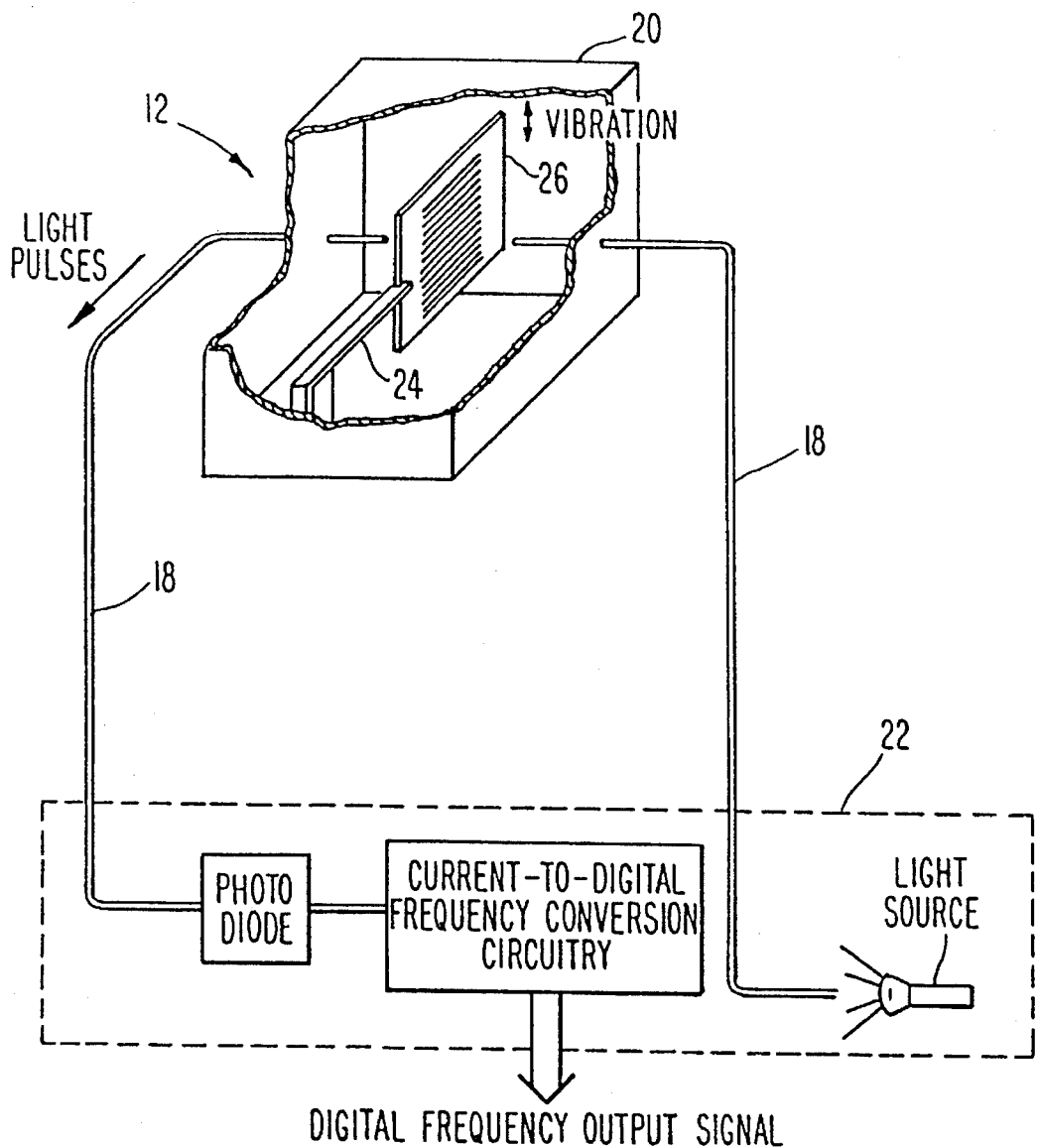
FIG. 2 is a more detailed depiction of the optical vibration sensor 12.
Figure 3C:
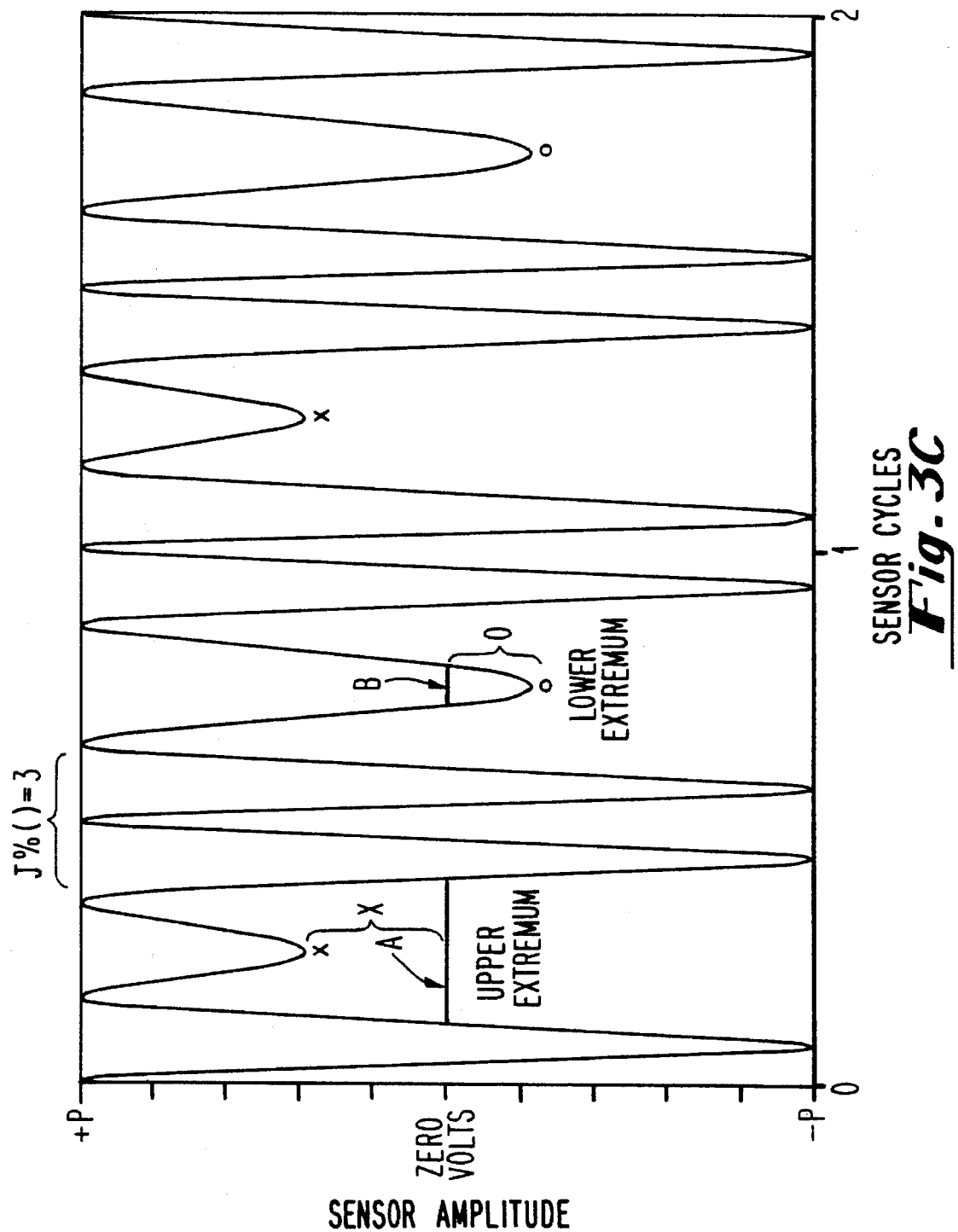

FIG. 3C depicts an exemplary sensor waveform (voltage amplitude over two cycles). The extremum intervals for an upper extremum and a lower extremum are also shown. The upper extremum is represented by the "x" (position extremum) or the line "A" (time interval extremum) and the lower extremum interval is represented by the "o" or the line "B." It should be noted that the upper extrema can be represented equally well by the distance X (i.e., the distance from 0 to x) or the time interval A in FIG. 3C. Likewise, the lower extrema can be represented by the distance O or the time interval B. The time interval representation will be used herein for the following reason. If the position representation of the extrema is used, no fold-over occurs when X reaches P (the top of the graph) and is reflected back (note that X can never exceed A). If the time interval representation of the extrema is used, fold-over occurs when X=0 and A suddenly changes from a large value to a small value, or vice versa. While the two representations are certainly different ways of defining the extrema, they are nearly equivalent. However, the position representation does not behave in a linear manner, while the time interval representation does. Therefore, if the beat amplitude is slowly increased, X would increase and reach P and then get smaller. This change in X is nonlinear with beat amplitude. That is, X tends to "hang-up" at P as the beat amplitude is increased. This is caused by the full intensity of light being received by the optical sensor for positions of the grid around the position at which light passes through. At a lower extremum, this occurs for the stop between two adjacent slits, i.e., the stop can move but it still blocks light for a certain small swing of the grid.

Thus, as a beat causes the grid to oscillate about an average position at each extremum, this time interval changes in a manner analogous to the change in amplitude of the signal at the extremum. A fold-over occurs when the beat amplitude or vibrational amplitude causes the sensor signal (i.e., waveform) to cut the zero amplitude axis and thereby define a new extremum time interval in a discontinuous manner. The same discontinuity occurs in the method disclosed in U.S. Pat. No. 5,146,776 when the signal experiences fold-over at upper and lower peaks.

Figure 3D:
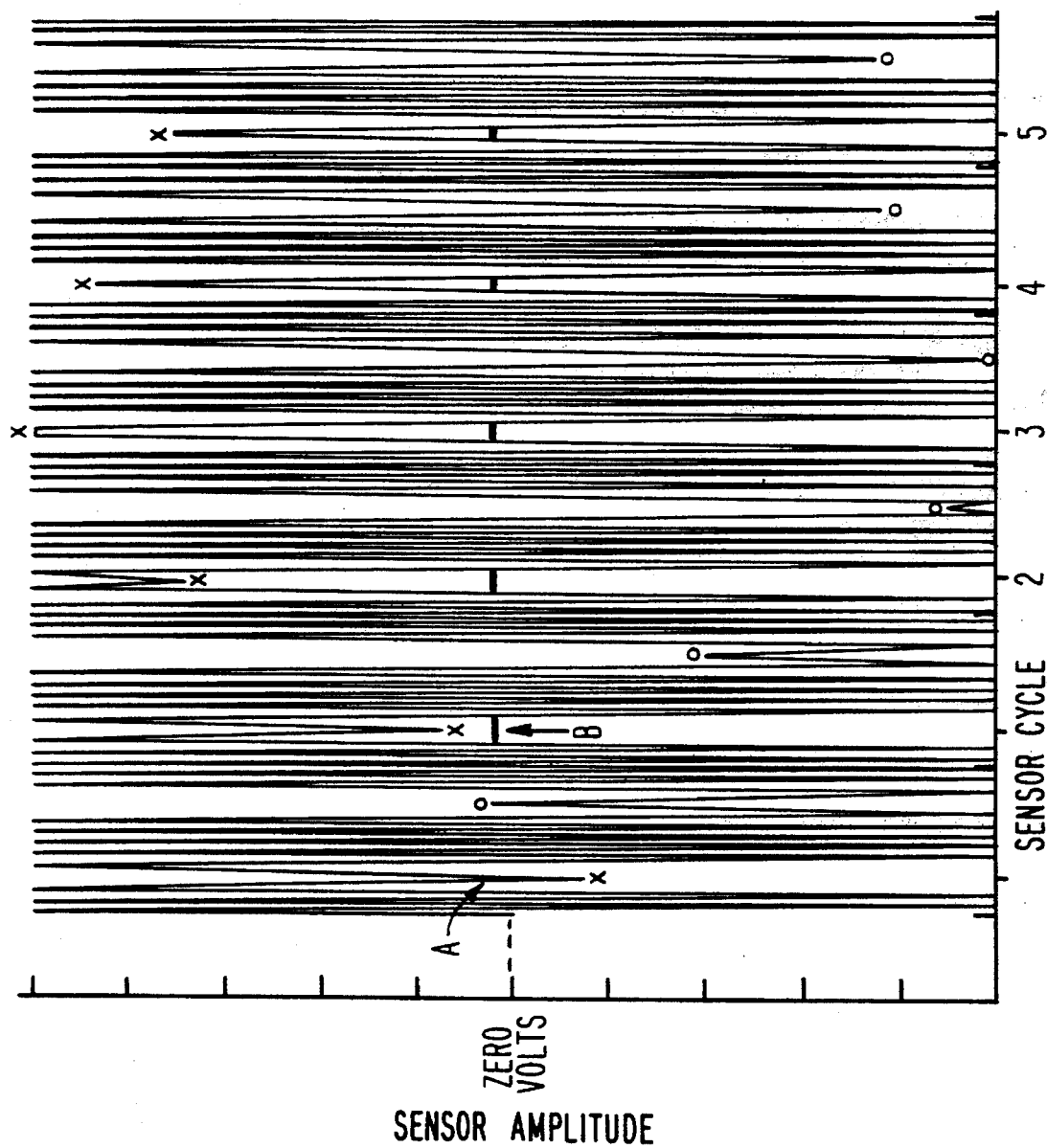

FIG. 3D illustrates a discontinuous change in the extremum time interval as the upper extrema pass from interval A to interval B. These discontinuities create problems in determining the sensor beat frequency.

Preferred embodiments of the present invention collect and process only signal zero crossing times and do not digitize the complete sensor signal. This greatly reduces data acquisition requirements and permits a highly accurate measurement. An existing Blade Vibration Monitor (BVM) 32 MHz card (zero crossing card) may be used for this purpose. The BVM card is able to determine the signal zero crossing times to within 30 billionths of a second, permitting a very accurate measurement of the beat frequency. Data files are typically 12,000 entries long. To achieve the same accuracy, the direct digitization procedure disclosed in the patent would require a 320,000 entry data file. Most of this data would be discarded. However, considerable time and expensive hardware are required to accomplish this. Therefore, the present invention minimizes the required data and reduces hardware cost and computer processing time.

The algorithm described below determines the beat frequency in the FOVM sensor when a high beat frequency amplitude causes one or more additional grid slits to pass light. This phenomenon causes fold-over. Two types of extrema, upper and lower, are generated in the sensor signal each sensor cycle. An extremum time interval is determined by the signal zero crossings on either side of each extremum. The upper extremum interval occurs when the grid momentarily comes to rest at the very top of its path. Likewise, the lower extremum interval occurs when the grid momentarily comes to rest at the bottom of its path.

At low beat amplitude, the beat causes a small modulation in the extremum time intervals. A plot of lower extremum intervals vs. sensor cycles results in a sinewave with a frequency equal to that of the beat. When the beat amplitude gets larger (or smaller), causing an additional (or loss of) two zero crossings, this procedure of extracting the beat frequency becomes confused by the sudden appearance of an unexpected small (or large) extremum interval, resulting in a large discontinuity in the beat signal.

Figure 3E:
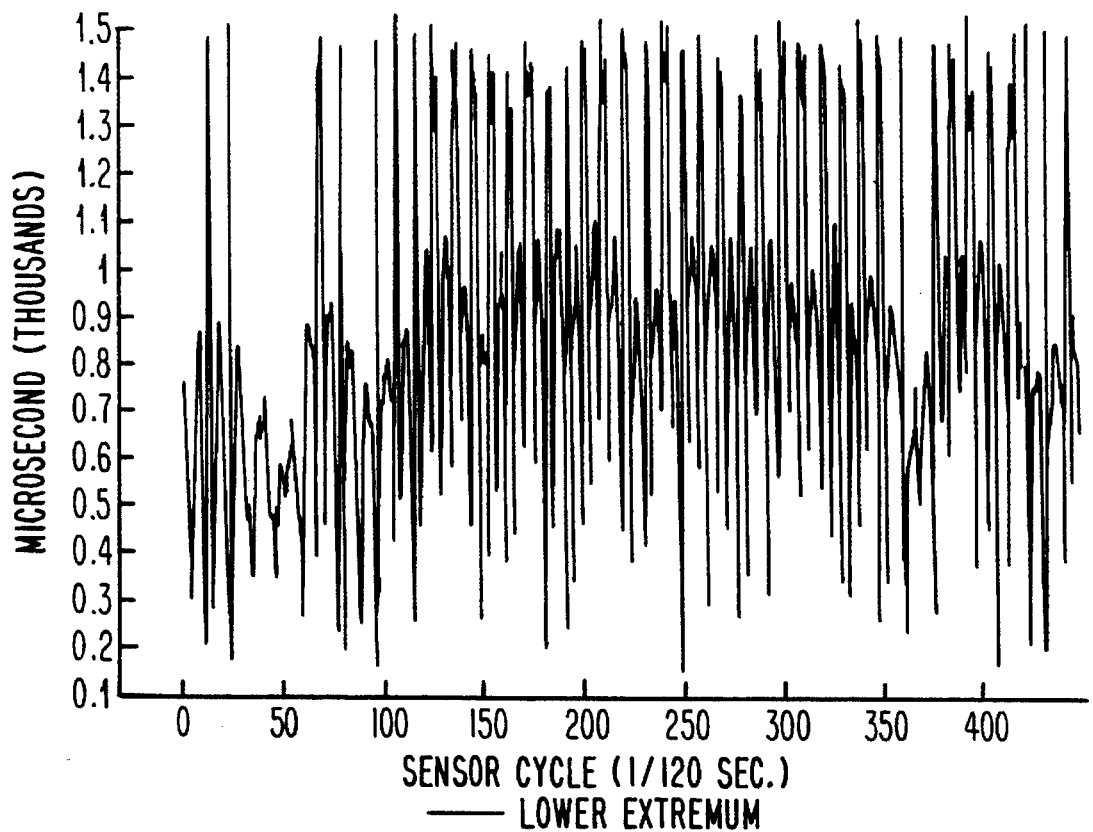
Figure 3F:
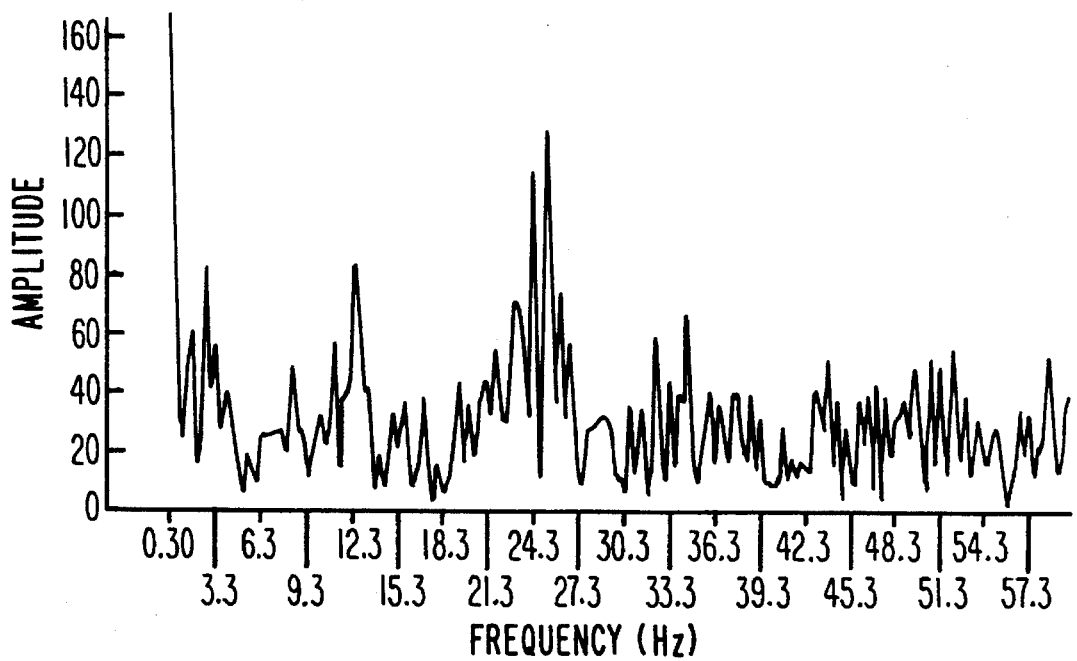

FIG. 3E depicts the extremum time interval, referred to herein as "DELTA()," at the lower extrema occurring once each sensor cycle for 450 sensor cycles. This highly chaotic and discontinuous waveform shows no harmonic beat signal. FIG. 3F depicts a Fourier Transform of this data. The beat frequency expected at 12.6 Hz is lost in the noise generated by the fold-overs (added zero crossings) at the extrema.

According to the present invention, the extremum interval DELTA() is expanded by summing over the appropriate number of adjacent intervals to account for beat amplitude increase or decrease when fold-over occurs. The algorithm described below determines when a fold-over has occurred and extends the measured time interval DELTA() by adding to that interval at the extrema the correct number of intervals on either side of the extremum interval. The algorithm may be implemented with computer software written, e.g., in the QUICK BASIS (by Microsoft) programming language. DELTA() at a minimum is one center time interval but may be that center time interval plus one, two, three, or more time intervals on either side of the center time interval. Determining how many intervals about the extremum interval to sum over is complicated by the following:

It is known when two additional zero crossings have been added (or lost) between adjacent extrema but, without specific knowledge of the waveform, it is not known which extrema, upper or lower, were responsible. According to the present invention, the FOVM collects and processes only signal zero crossing times and does not digitize the complete sensor signal. This greatly reduces data acquisition requirements and permits a more highly accurate measurement. A 32 MHz clock zero crossing board may be used for this purpose.

It is important to determine the correct starting parameters for the summing intervals. The state of each extremum can be determined by only one parameter, referred to herein as "J%()." J%() is the number of time intervals (zero crossings plus one) between the extremum in question and the previous extremum. The summing parameter "S1()" specifies the number of intervals to be summed over at each extremum. The number of intervals to be summed over is equal to 2*S1()+1. Incorrect starting values of the summing parameter (i.e., values of S1(1) and S1(2)) will lead to disaster.

The odd DELTA() are the correct expanded time intervals for each upper extremum and the even DELTA() are the correct expanded time intervals for each lower extremum. (Note that "DELTA()" represents DELTA(1), DELTA(2), . . . DELTA(N), where N=450 in FIG. 3E.)

Figure 3G:
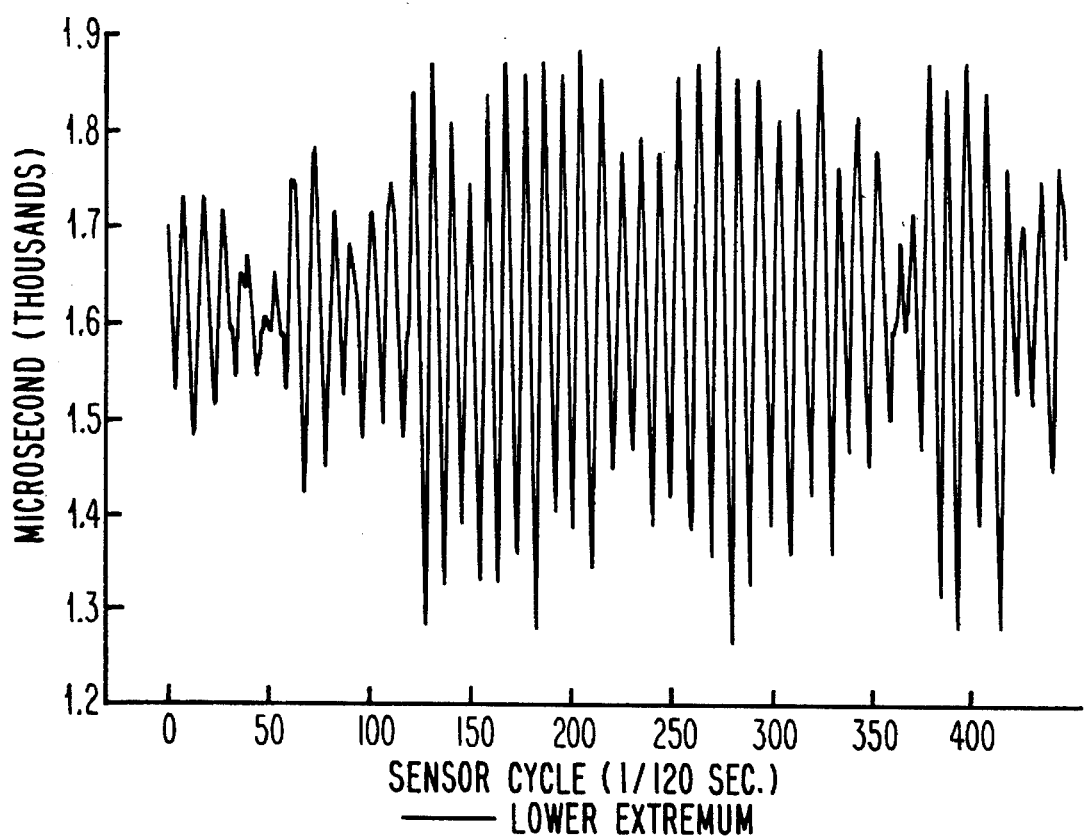
Figure 3H:
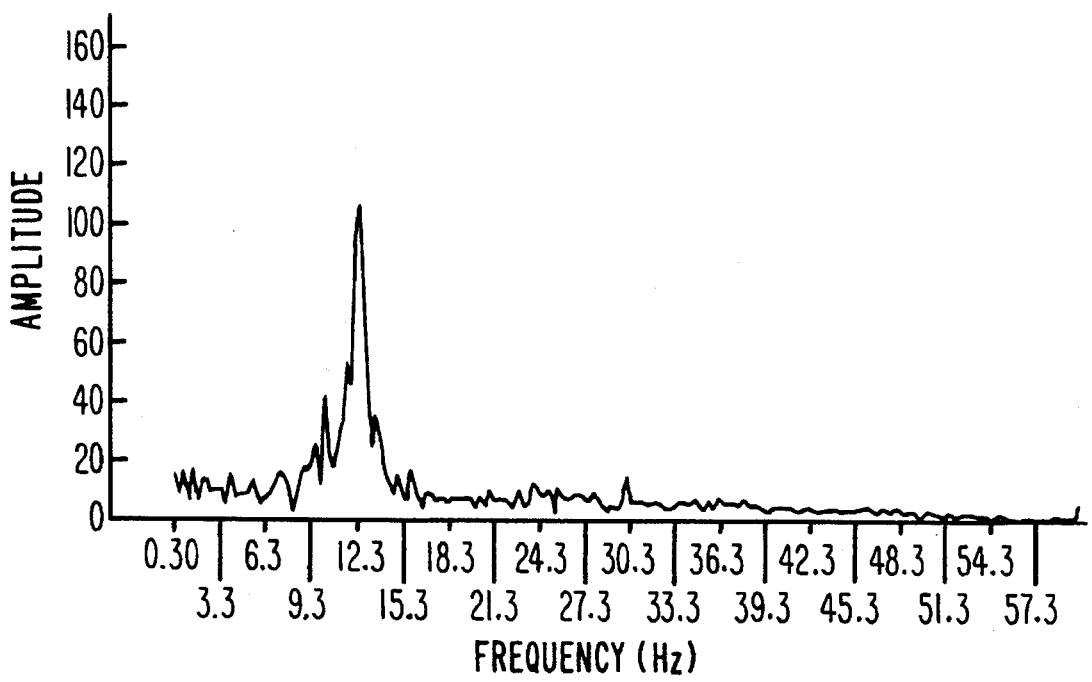

FIG. 3G depicts a plot of DELTA() for the lower extrema for the same data used in FIG. 3E. Unlike FIG. 3E, however, the extrema intervals DELTA() are expanded by the addition of the correct number of adjacent time intervals. The beat is clearly and unambiguously seen. FIG. 3H shows a Fourier Transform of the lower extrema beat signal. The beat frequently of 12.6 Hz is clearly identified. The sensor natural frequency is thus 120 Hz+12.6 Hz=132.6 Hz and the sensor correction factor can thus be easily found. The same procedure performed for the upper extrema would achieve identical results (this would be useful, e.g., as a check).

One preferred embodiment of a computer implemented algorithm in accordance with the present invention will now be described with reference to the flow diagram of FIGS. 4A–4D. A zero crossing I/O card produces a one-dimensional data array Z() (e.g., with approximately 10,000 entries) representing the absolute time (clock count) at which the FOVM sensor voltage crossed the zero volt level. Z() is therefore an array of monotonically increasing numbers representing zero crossing times as clock counts. There are 10,000 storage locations in the Z() array in one exemplary embodiment of the invention.

The blocks of the flow diagram correspond to steps 1–5 as follows:

Step-1=Blocks 100–106
Step-2=Blocks 108–138
Step-3=Blocks 140–144
Step-4=Blocks 146–174
Step-5=Blocks 176–200

Briefly, steps 1–5 perform the following functions: Step-1 calculates time intervals (clock counts) between consecutive zero crossing. The respective clock counts are stored in the X() array. Step-2 finds positions of extrema time intervals in the X() array (K of them), finds the number of intervals that occur between adjacent extrema (represented by J%()), and finds the minimum number of intervals that occur between any two neighboring extrema. This minimum number is represented by the variable MIN. As the beat amplitude increases, more time intervals about the extrema time interval must be summed. Step-3 finds the first point (START) in the series of extrema where the beat amplitude is a minimum and subsequently only one time interval is required to form the corrected time interval data (represented by DELTA()), i.e., there is no fold-over. Step-4 comprises a forward chain that determines the number of intervals about each extremum interval to sum over from the point START to K. Note that S1(START)=S1(START+1)=0 (since there is no fold-over). Step-5 comprises a backward chain from K-1 to 0 that determines whether the number of time intervals to be summed over should change based on the number of interval counts J%() between extrema occurring after the last extremum of this type, i.e., upper or lower.

Figure 4A:
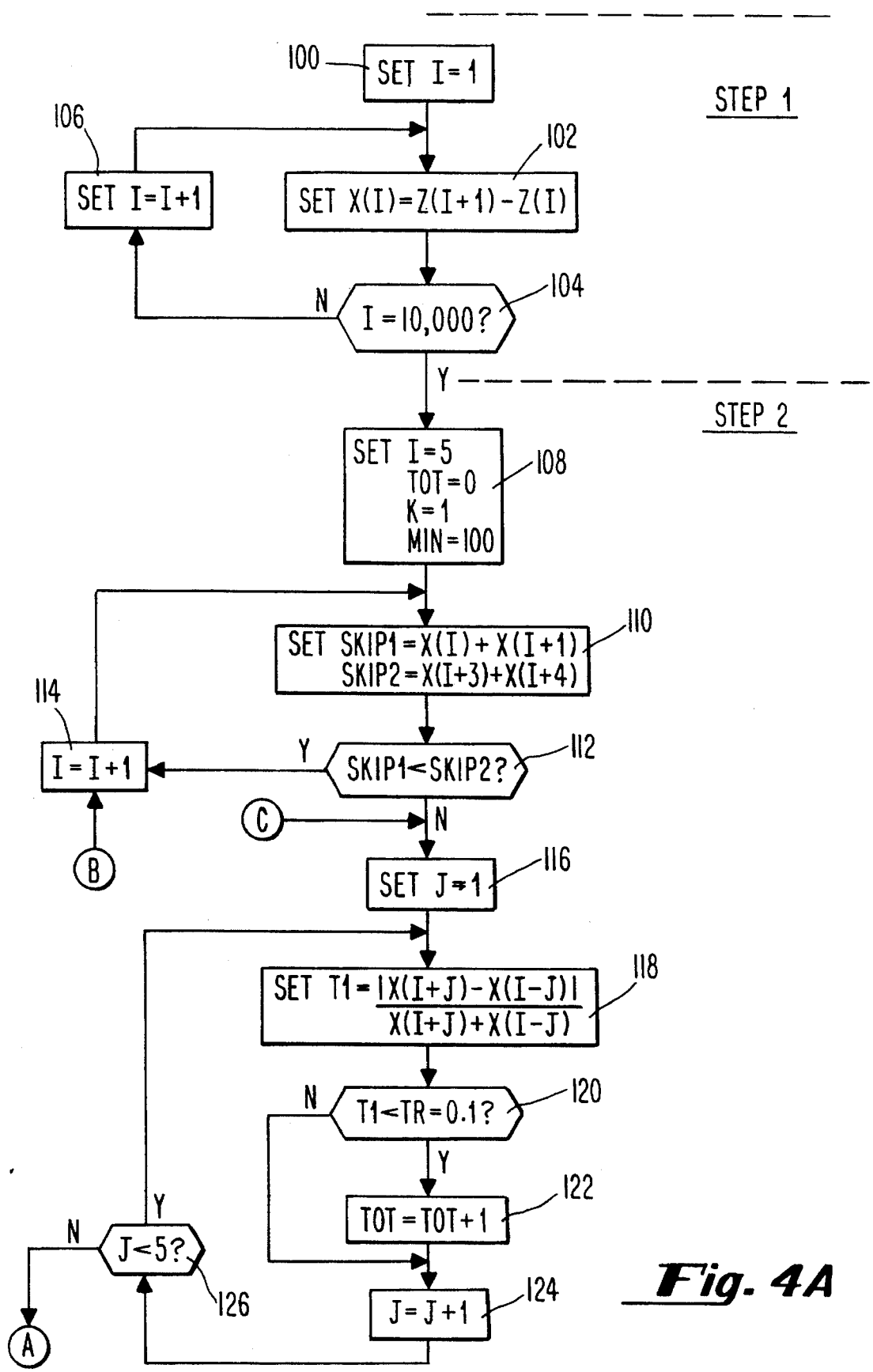
Figure 4B:
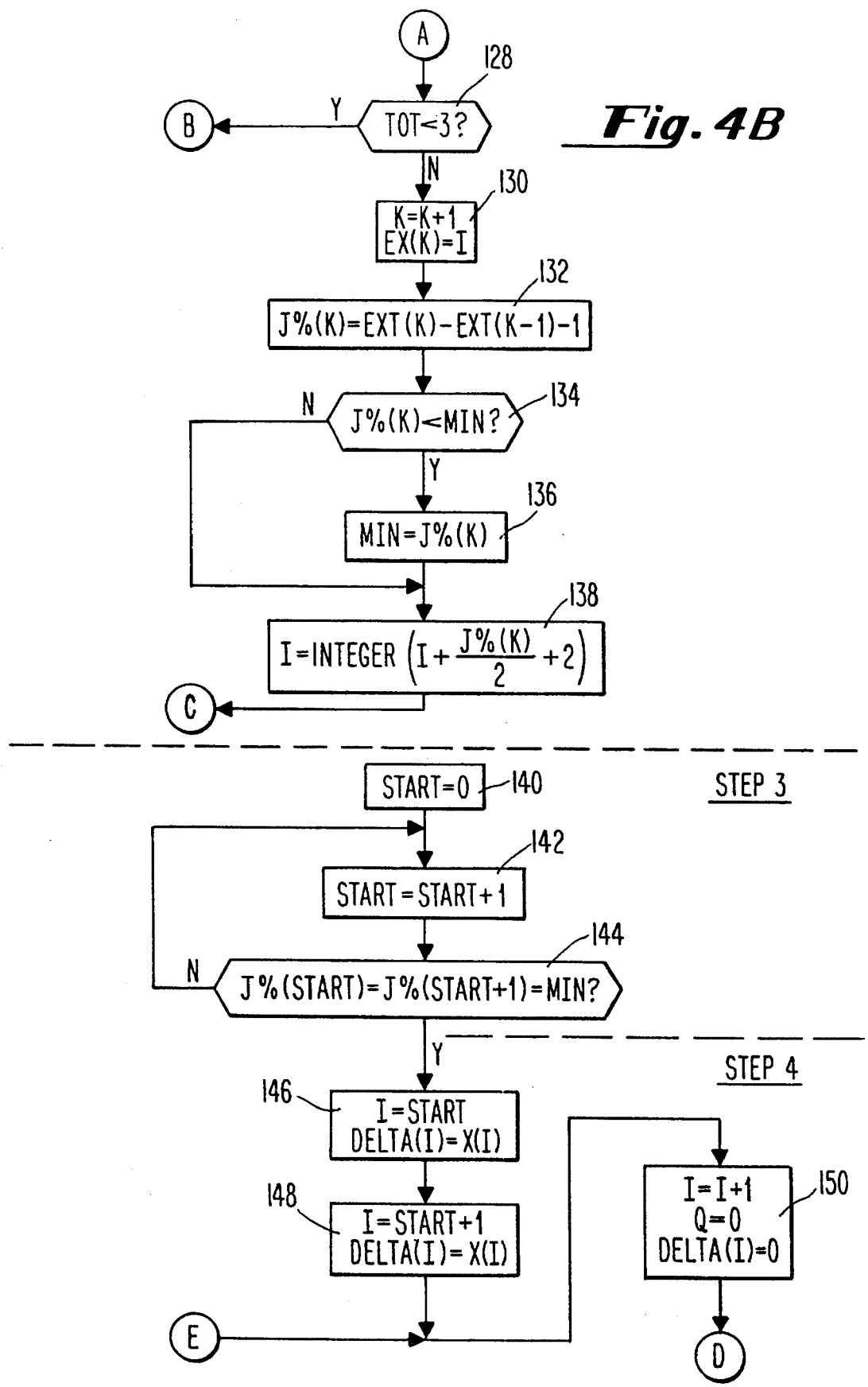
Figure 4C:
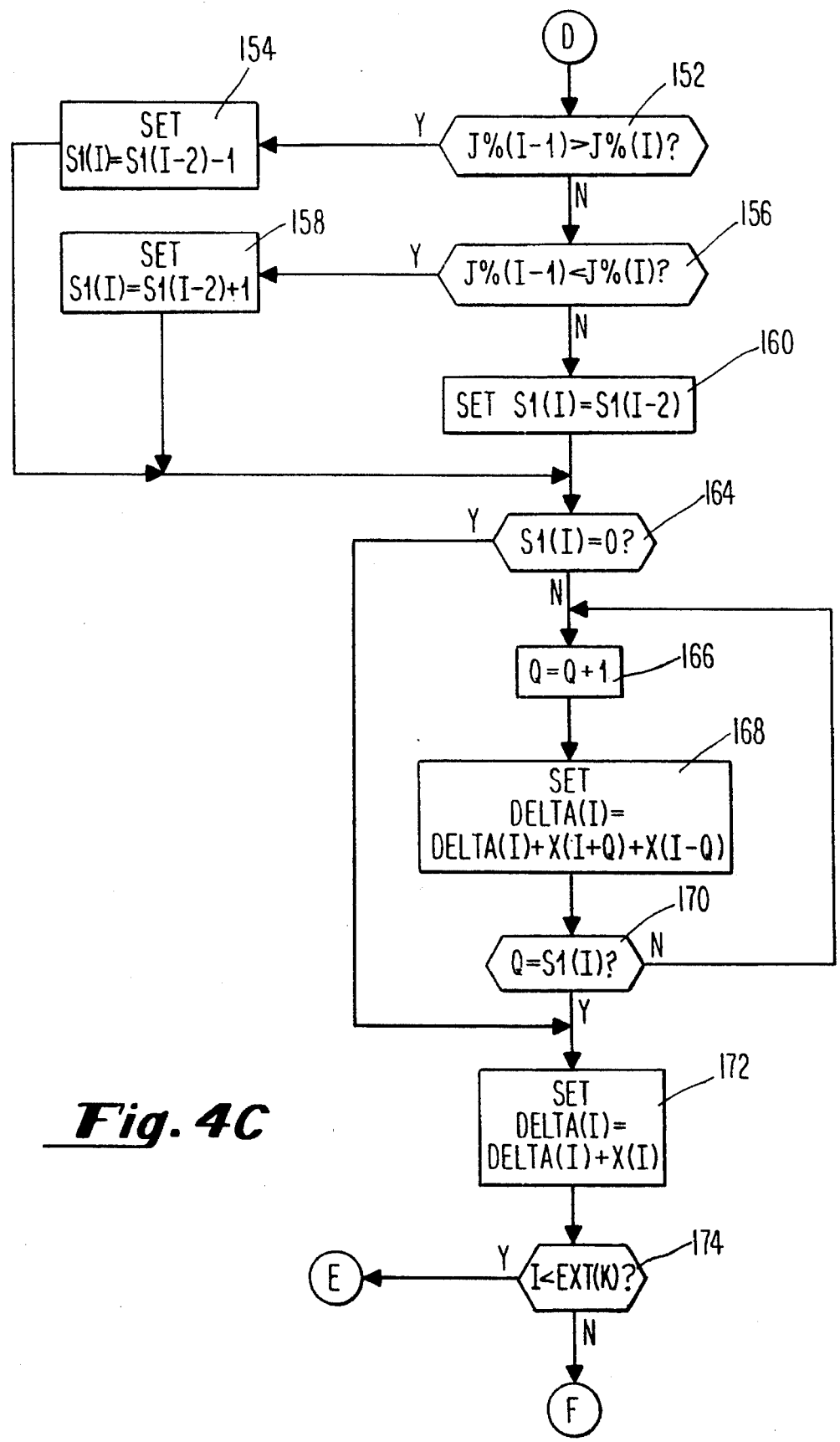

Step-1
Referring now to FIG. 4A, at block 100 the variable "I" is set to 1. At block 102, X(I) is set to Z(I+1)−Z(I). At step 104, I is compared to 10,000. If I is not equal to 10,000, the program branches to block 106; otherwise it proceeds to block 108. At block 106, I is set to I+1.

Step-2
At block 108, I is set to 5, TOT is set to 0, K is set to 1, and MIN is set to 100. At block 110, "SKIP1" is set to X(I)+X(I+1) and SKIP2 is set to X(I+3)+X(I+4). At block 112, SKIP1 is compared to SKIP2. If SKIP1 is less than SKIP2, the program proceeds to block 114; otherwise it proceeds to block 116. At block 114, I is set to I+1 and the program branches back to block 110. Thus, blocks 110–114 look ahead to ensure that the time intervals are increasing in length. This ensures that the symmetric point in the time interval array X() that occurs between extrema is not detected.

At block 116, J is set to 1. At block 118, T1 is set to the absolute value of (X(I+J)−X(I−J)) divided by the quantity (X(I+J)+X(I−J)). At block 120, T1 is compared to a trigger variable "TR," which in preferred embodiments is equal to 0.1. If T1 is less than TR, the program branches to block 122; otherwise it proceeds to block 124. At block 122, TOT is set to TOT+1. At block 124, J is set to J+1. At block 126, J is compared to the number 5. If J is less than 5, the program branches back to block 118; otherwise it proceeds to block 128. At block 128 TOT is compared with the number 3. If TOT is less than 3, the program branches back to block 114 (FIG. 4A); otherwise it proceeds to block 130. At block 130, the variable EX(K) is set to I. At block 132, J%(K) is set to EXT(K)–EXT(K–1)–1. At block 134, J%(K) is compared to MIN. If J%(K) is less than MIN, the program branches to block 136; otherwise it proceeds to block 138. At block 136, MIN is set to J%(K). At block 138, the index I is set to the integer value of (I+J%(K)/2+2). The program then branches back to block 116 (FIG. 4A), i.e., if I is less than 10,000 (the test to determine whether I is less that 10,000 is not depicted in the drawings).

The following points should be noted in connection with the above description of Step-2 (comprising blocks 108–138): Block 118 calculates a symmetry parameter T1. With decision block 120, corresponding time intervals on either side of the Ith interval are judged symmetric. With block 122, the program counts the number of corresponding time intervals about the Ith interval that are symmetric. With block 126, the program tests four corresponding time intervals about the Ith time interval for symmetry. With block 128, the program assures that three of four corresponding interval are judged symmetric for the Ith time interval to be judged in extremum. With block 130, the program identifies the location of the extremum just found (i.e., the Kth extremum) in the time interval array X(). This is called the upper extrema. With block 132, the program determines the minimum number of time intervals that occur between extremum K and the previous extremum K–1. With blocks 134–136, the program records the number of time intervals that has been measured between the extremum. This number is assigned to the variable MIN. With block 138, the index I is incremented to skip over the next symmetric time interval that occurs between extrema. After steps 1 and 2 have been completed, the position EXT(K) of all K extrema in the time interval array X(I) have been found. The odd K are arbitrarily identified as upper extrema and even K are identified as lower extrema. The number of time intervals that occur between extrema is also calculated and stored in the variable array J%(K). The minimum value stored in the J%() array is stored in the variable MIN.

Step-3

Referring again to FIG. 4B, Step-3 begins at block 140 by setting START to 0. At block 142, START is set to START+ 1. At block 144, J%(START), J%(START+1), and MIN are compared. If the three are not equal to one another, the program branches back to block 142; otherwise it proceeds to block 146. In this manner, the program finds the first time that two adjacent extrema equals MIN.

Step-4

At block 146, the index I is set to START and DELTA(I) is set to X(I). At block 148, I is set to START+ 1 and DELTA(I) is set to X(I). In this manner, the first two corrected time intervals (DELTA()) have a sum index S1() equal to 0. The program is only required to sum over the center interval for these two extrema. At block 150, I is set to I+ 1, Q is set to 0, and DELTA(I) is set to 0. At block 152 (FIG. 4C), J%(I–1) is compared to J%(I). If the former is greater than the latter, the program branches to block 154; otherwise it proceeds to block 156. At block 154, the sum index S1(I) is set to S1(I–2)–1. At block 156, J%(I–1) is compared to J%(I). If the former is less than the latter, the program branches to block 158; otherwise it proceeds to block 160. At block 158, S1(I) is set equal to S1(I–2)+ 1. At block 160, the sum index S1(I) is set to S1(I–2). Thus, blocks 150–160 determine whether the number of intervals to be summed over (i.e., the sum index, S1()) should be changed based on the number of interval counts (J%()) between extrema occurring before the last extremum of this type, i.e., upper or lower. Block 154 decrements the sum index S(1) by 1 if the interval count J%() decreases. Block 158 increments the sum index S1() by 1 if the interval count J%() increases. Block 160 leaves the sum index S1() unchanged, i.e., if the interval count neither decreases nor increases.

At block 164, S1(I) is compared to 0. If it is equal to 0, the program branches to block 172; otherwise it proceeds to block 166. At block 166, the variable Q is set equal to Q+1. At block 168, DELTA(I) is set equal DELTA(I)+ X(I+Q)+ X(I–Q). At block 170, Q is compared with S1(I). If the two are equal, the program proceeds to block 172; otherwise it branches back to block 166. Therefore, blocks 164–170 sum up the two S1() time intervals on either side of the center time interval (this may be done more than once for a multiple fold-over). At block 172, DELTA(I) is set equal to DELTA(I)+ X(I). Block 172 adds in the center time interval. At block 174, I is compared with K. If I is less than K, the program branches back to block 150 (FIG. 4B); otherwise it proceeds to block 176 (FIG. 4D). Thus, the program returns to the start for analysis of the next higher extremum if I is less than K; otherwise it exits to begin the backward chain.

Referring to FIG. 4D, the program at block 176 sets the index I to START. At block 178, I is set to I–1, Q is set to 0, and DELTA(I) is set to 0. At block 180, J%(I+ 2) is compared with J%(I+1). If the former is greater than the latter, the program branches to block 182; otherwise it proceeds to block 184. At block 182, S1(I) is set equal to S1(I+2)–1. At block 184, J%(I+2) is compared with J%(I+ 1). If the former is less than the latter, the program branches to block 186; otherwise it proceeds to block 188. At block 186, S1(I) is set equal to S1(I+2)+1. At block 188, S1(I) is set equal to S1(I+2). Thus, blocks 180–188 determine whether the number of time intervals to be summed over should change based on the number of interval counts between extrema occurring after the last extremum of this type, i.e., upper or lower. With block 182, the program decrements the sum index S1() if the interval count J%() increases. With block 186, the program increments the sum index S1() if the interval count J%() decreases. With block 188, the sum index S1() is unchanged, i.e., if the interval count neither increases nor decreases.

At block 190, S1(I) is compared with 0. If it is equal to 0, the program proceeds to block 192; otherwise it branches to block 194. At block 192, DELTA(I) is set equal to DELTA(I)+X(I). At block 194, Q is set equal to Q+1. At block 196 DELTA(I) is set equal to DELTA(I)+X(I+Q)+ X(I–Q). At block 198, Q is compared with S1(I). If the two are equal, the program branches to block 192; otherwise it loops back to block 194. Thus, blocks 190–198 sum up the two S1(I) time intervals on either side of the center time interval I, and repeats this process if a multiple fold-over exists. Block 192 adds in the center time interval I. At block 200, I is compared with 1. If I is greater than 1, the program branches back to block 178; otherwise it ends. Thus, the program returns to start the next lower extremum until it reaches the front end, which is when I=1.

To perform a Fourier Transform or Fast Fourier Transform (FFT), the program lets the number of sensor cycles captured be K=1024, which corresponds to 8.53 seconds of data. The dependent variable DELTA(2I), I=1–512, has the units of time. However, this is not important, since only the variation in time (frequency) of this signal is used. The variable 2I is therefore also representative of time. The time interval between 2I=2 and at 2I=4 is $\frac{1}{120}$ of a second. This is for the lower extrema.

For the upper extrema, the dependent variable DELTA (2I–1), I=1–512, is the time interval between data points 2I–1=1 and 2I–1=3, which again is $\frac{1}{120}$ of a second. A Fourier Transform or FFT on DELTA(2I) and then on DELTA(2I−1) will yield identical sensor beat frequency $F_B$ with a resolution of 0.117 Hz. The sensor natural frequency $F_N$ equals 120 Hz+$F_B$. The sensor correction factor "CF" is given by the expression, $$C_F = (F_N^2 - F_0^2)/(F_I^2 - F_0^2),$$

where $F_0$ is the excitation or driving frequency applied to the sensor (typically 120 Hz) and $F_I$ is the sensor design frequency (typically 132.5 Hz).

Many features and advantages of the present invention are apparent from this specification and thus it is intended by the appended claims to cover all such features and advantages which fall within the true spirit and scope of the present invention.

I claim:

1. A method for determining a beat frequency in a vibration sensing system attached to equipment, comprising the steps of:
    (a) generating a vibration signal indicative of a vibrational frequency and amplitude of the equipment; and
    (b) obtaining a beat frequency from the vibration signal by storing and processing time interval data representing the time intervals between zero crossings of the vibration signal.

2. A method as recited in claim 1, wherein step (b) further comprises performing a Fourier transform on the time interval data to obtain transformed time interval data which has a peak value at a point corresponding to the beat frequency.

3. A method as recited in claim 1, wherein step (b) comprises calculating time interval data by summing clock counts between consecutive zero crossings of the vibration signal.

4. A method as recited in claim 3, wherein step (b) further comprises finding positions of extrema time intervals corresponding to fold-overs in the time interval data, and compensating for said fold-overs by changing the number of clock counts summed between extrema affected by said fold-overs.

5. A method as recited in claim 1, wherein the equipment is an electrical generator having a 120 Hz end-turn vibration, the vibration signal is obtained with a vibration sensor attached to the generator, and the vibration signal includes a mechanical vibration signal resulting from the 120 Hz end-turn vibration of the electrical generator and the resonant frequency of a vibration sensor.

6. A method as recited in claim 1, wherein the equipment is an electrical generator having a 120 Hz end-turn vibration, the vibration signal is obtained with a vibration sensor attached to the generator, and the vibration signal includes a mechanical vibration signal resulting from the 120 Hz end-turn vibration of the electrical generator and the resonant frequency of a vibration sensor; and step (b) comprises calculating time interval data by summing clock counts between consecutive zero crossings of the vibration signal, finding positions of extrema time intervals corresponding to fold-overs in the time interval data, compensating for said fold-overs by changing the number of clock counts summed between extrema affected by said fold-overs, and performing a Fourier transform on the time interval data to obtain transformed time interval data which has a peak value at a point corresponding to the beat frequency.

7. A system for determining a beat frequency associated with a vibration sensing system attached to equipment, comprising:
    (a) means for generating a vibration signal indicative of a vibrational frequency and amplitude of the equipment; and
    (b) means for obtaining a beat frequency from the vibration signal by storing and processing time interval data representing the time intervals between zero crossings of the vibration signal.

8. A system as recited in claim 7, further comprising means for performing a Fourier transform on the time interval data to obtain transformed time interval data which has a peak value at a point corresponding to the beat frequency.

9. A system as recited in claim 7, comprising means for calculating time interval data by summing clock counts between consecutive zero crossings of the vibration signal.

10. A system as recited in claim 9, further comprising means for finding positions of extrema time intervals corresponding to fold-overs in the time interval data, and compensating for said fold-overs by changing the number of clock counts summed between extrema affected by said fold-overs.

11. A system as recited in claim 7, wherein the equipment is an electrical generator having a 120 Hz end-turn vibration, the vibration signal is generated by a vibration sensor attached to the generator, and the vibration signal includes a mechanical vibration signal resulting from the 120 Hz end-turn vibration of the electrical generator and the resonant frequency of a vibration sensor.

12. A system as recited in claim 7, wherein the equipment is an electrical generator having a 120Hz end-turn vibration, the vibration signal is generated by a vibration sensor attached to the generator, and the vibration signal includes a mechanical vibration signal resulting from the 120 Hz end-turn vibration of the electrical generator and the resonant frequency of a vibration sensor; and wherein the system further comprises means for calculating time interval data by summing clock counts between consecutive zero crossings of the vibration signal, finding positions of extrema time intervals corresponding to fold-overs in the time interval data, compensating for said fold-overs by changing the number of clock counts summed between extrema affected by said fold-overs, and performing a Fourier transform on the time interval data to obtain transformed time interval data which has a peak value at a point corresponding to the beat frequency.

13. In a method for calibrating a vibration sensor comprising the steps of obtaining a vibration signal from the vibration sensor, the vibration signal corresponding to vibration of equipment to which the sensor is attached; extracting a beat frequency vibration signal having a beat frequency from the vibration signal; computing a resonant frequency of the vibration sensor in dependence upon the beat frequency; and calibrating the vibration sensor in dependence upon the resonant frequency; an improved method for obtaining said beat frequency vibration signal, comprising the steps of:
    (a) generating a vibration signal indicative of a vibrational frequency and amplitude of the equipment; and
    (b) obtaining a beat frequency from the vibration signal by storing and processing time interval data representing the time intervals between zero crossings of the vibration signal.

14. A method as recited in claim 13, wherein step (b) further comprises performing a Fourier transform on the time interval data to obtain transformed time interval data which has a peak value at a point corresponding to the beat frequency.

15. A method as recited in claim 13, wherein step (b)

comprises calculating time interval data by summing clock counts between consecutive zero crossings of the vibration signal.

16. A method as recited in claim 13, wherein step (b) further comprises finding positions of extrema time intervals corresponding to fold-overs in the time interval data, and compensating for said fold-overs by changing the number of clock counts summed between extrema affected by said fold-overs.

17. A method as recited in claim 13, wherein the equipment is an electrical generator having a 120 Hz end-turn vibration, the vibration signal is obtained with a vibration sensor attached to the generator, and the vibration signal includes a mechanical vibration signal resulting from the 120 Hz end-turn vibration of the electrical generator and the resonant frequency of a vibration sensor.

18. A method as recited in claim 13, wherein the equipment is an electrical generator having a 120 Hz end-turn vibration, the vibration signal is obtained with a vibration sensor attached to the generator, and the vibration signal includes a mechanical vibration signal resulting from the 120 Hz end-turn vibration of the electrical generator and the resonant frequency of a vibration sensor; and step (b) comprises calculating time interval data by summing clock counts between consecutive zero crossings of the vibration signal, finding positions of extrema time intervals corresponding to fold-overs in the time interval data, compensating for said fold-overs by changing the number of clock counts summed between extrema affected by said fold-overs, and performing a Fourier transform on the time interval data to obtain transformed time interval data which has a peak value at a point corresponding to the beat frequency.

* * * * *